April 28, 1959        R. S. REAVES        2,884,080
GAUGE WHEEL ATTACHMENT
Filed Dec. 7, 1956
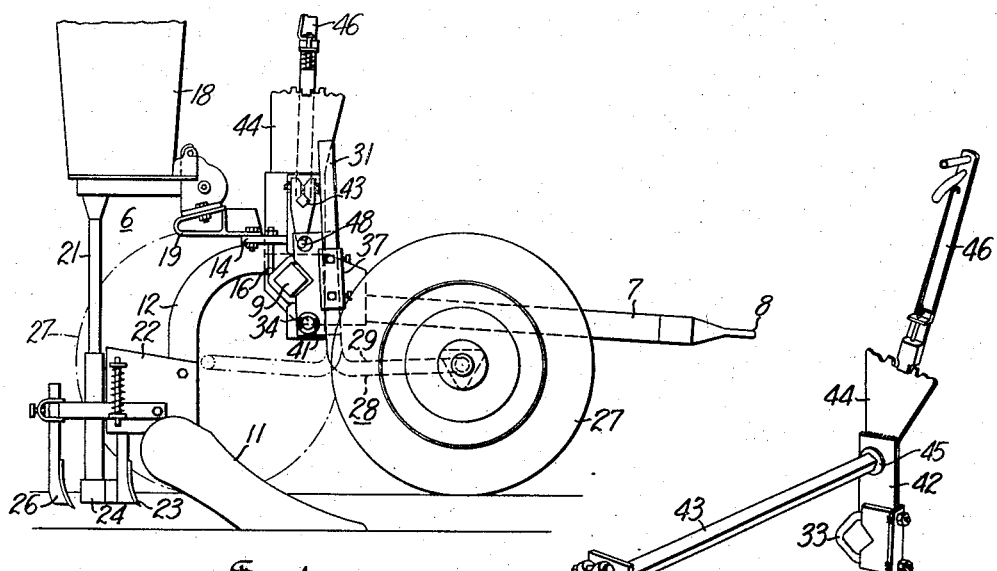
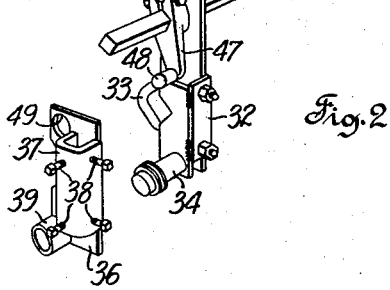
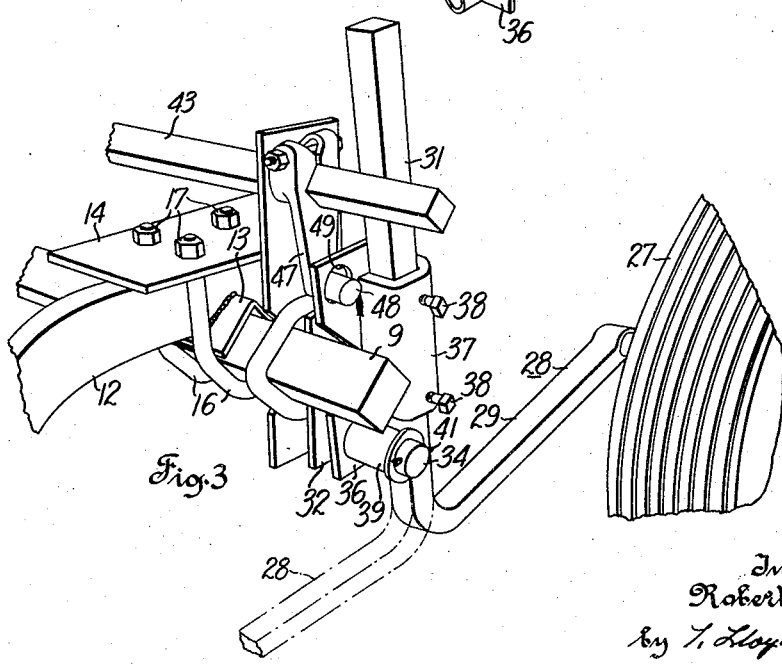
Inventor
Robert S. Reaves
By T. Lloyd La Fave
Attorney

United States Patent Office 2,884,080
Patented Apr. 28, 1959

2,884,080

GAUGE WHEEL ATTACHMENT

Robert S. Reaves, Waukesha, Wis., assignor to Allis-Chalmers Manufacturing Company, Milwaukee, Wis.

Application December 7, 1956, Serial No. 626,981

6 Claims. (Cl. 172—415)

This invention relates to agricultural implements and is more particularly concerned with implements such as planters, listers and bedders which employ a gauge wheel that is adjustable vertically relative to the frame of the implement.

The principal object of the invention is to provide an improved gauge wheel assembly and adjustable mechanism that is economical to construct and simple to attach and detach.

A more specific object of the invention is to provide a gauge wheel assembly that is constructed and arranged to permit a dual range of vertical adjustment of the gauge wheel relative to the frame of the implement and that permits fore and aft reversal of the position of the gauge wheel in its support.

These and other objects of the invention may be apparent to one skilled in the art upon a reading of the following description with the accompanying drawing, in which:

Fig. 1 is a side view in elevation of a planter or bedder having a transverse tool bar supporting the improved gauge wheel assembly of the present invention;

Fig. 2 is an exploded view in perspective on a somewhat enlarged scale of parts of an adjusting mechanism for the gauge wheel assembly of the implement shown in Fig. 1; and Fig. 3 is a perspective view on a further enlarged scale of a portion of the machine shown in Fig. 1 and shows the mounting of the gauge wheel assembly on the transverse tool bar and the interconnection of the adjusting mechanism of Fig. 2.

Referring to the drawing, in Fig. 1 reference numeral 6 indicates an agricultural implement such as a bedder, lister or planter. The implement shown comprises an A-shaped draft transmitting frame and implement tongue having a forward end defining a single hitch point 8 that is adapted for connection in vertically swingable relation to a propelling tractor, not shown.

A transverse tool bar 9 is rigidly connected to laterally spaced rearward end portions of frame 7. A plurality of laterally spaced furrow openers such as bedder bottoms 11 are rigidly supported on the tool bar 9 by means of stub beams 12. Each stub beam 12 has an L-shaped channel 13 welded to its underside which seats on the rectangular shaped tool bar 9. A plate 14 overlies the stub beam 12 and receives the ends of a pair of U-bolts 16 disposed adjacent opposite sides of the stub beam 12 and encircling tool bar 9. Nuts 17 on the U-bolts bear against plate 14 to clamp the beam and tool bar rigidly together and are detachable to permit removal or lateral adjustment of the stub beam 12 along the tool bar 9.

Combination hoppers 18, Fig. 1, may be a part of the implement and mounted in association with the furrow openers 11. Hopper 18 is detachably mounted in a known manner to a bracket 19 that is bolted to the rearwardly extending position of plate 14. A seed tube 21 attached to the bottom of each hopper 18 extends downwardly behind a furrow opener 11. A covering frame attachment 22 is secured to the lower end of the stub beam, and extends rearwardly to support an opener 23 mounting a guide 24 for the lower end of the seed tube 21, and a seed covering tool 26.

Means for controlling the operating depth of the working tools, such as the bedder bottoms, openers and cover tools, comprises left and right hand gauge wheels 27 mounted on opposite sides of the implement. Right and left is determined upon viewing the implement from the rear in the direction of implement travel. The depth of operation of the furrow openers 11 is governed by the vertically adjustable positions of the gauge wheels relative to the transverse tool bar.

Each gauge wheel 27 is rotatably supported on a crank axle 28 having a generally fore and aft horizontally extending portion 29 and a standard or vertically extending portion 31.

Pivot means supporting the gauge wheels for vertical swinging movement relative to the tool bar 9 comprises a bearing or fixed mounting bracket 32 that has a U-bolt 33 rigidly clamping the bearing bracket to the tool bar. A bearing stud 34 extends laterally of the fixed bracket 32 to provide a pivot axis below the tool bar for a gauge wheel mounting bracket 36. Mounting bracket 36 has a sleeve vertical portion 37 receiving the standard or vertical shank portion of the gauge wheel crank axle with the shank portion longitudinally adjustable in the sleeve 37, and set screws 38 in sleeve 37 secure the shank portion intermediate its ends in position. The shank portion 31 of the crank axle and sleeve 37 are correspondingly shaped of rectangular section and permit 180 degree reversal in a horizontal plane of the crank axle as indicated by the dot and dash lines in Figs. 1 and 3. Thus, the gauge wheel may be forward and leading or rearward and trailing of the bracket mounting 36.

A sleeve bearing 39 on the bracket mounting 36 is journaled on the stud 34 and secured thereto by a cotter pin 41 that extends through the end of the stud and bears against a washer abutting the end of the sleeve bearing.

Another fixed mounting bracket 42, Fig. 2 is secured to tool bar 9 and is laterally spaced from fixed bracket 32. Bracket 42 rotatably supports a pivot bearing 45 disposed on an end portion of a rock shaft 43 that is parallel with tool bar 9 and is operated in a known manner by a detent mechanism including a ratchet plate 44 and a lever 46 secured to the rock shaft. The other end of the rock shaft 43 extends through an aperture in fixed mounting bracket 32 for rotation therein. A crank arm 47 is clamped to the rock shaft adjacent the fixed mounting bracket and has a laterally extending stud or finger 48 that extends through aperture 49 in the rotatable bearing bracket 36. Aperture 49 is elongated vertically a predetermined amount to permit a predetermined limited pivotal movement of the bearing bracket 36 upon rotation of the rock shaft 43.

As shown in Fig. 3, the transverse axis of the pivot means is stud 34 located intermediate the ends of the vertical shank portion of the crank axle. The free end of the standard or shank portion 31 of the crank axle is secured in the bearing bracket sleeve which is disposed above the pivot axis of stud 34 and vertically between such axis and the rock shaft 43. The walls of the elongated aperture 49 provide stops abutting stud 48 to prevent pivot movement of bracket 36 in either direction except upon movement of the stud upon rotation of the rock shaft 43.

The dual range of adjustment of the gauge wheels provided by the rock shaft and bearing bracket structure is utilized in the following manner. The levers 46 are positioned in the center of the detent's ratchet plates 44; the shanks or vertical portions of the gauge wheel crank axles are secured in their respective sleeves of the bearing brackets for a desired operating depth of the implement working tools such as the bedder bottoms 11. For adjusting the operating depth of one side of the implement relative to the other, one rock shaft is adjusted relative to the other to vary the vertical spacing of one gauge wheel from the tool bar relative to the vertical spacing of the other from the tool bar, such as is required in some planting conditions where it may be necessary to raise or lower one gauge wheel as much as three inches relative to the tool bar, and to alternate the adjustments with return trips across a field, as on one trip the left gauge wheel may be rolling on soil compacted by the previous trip, and on the return trip the right gauge wheel may be rolling on soil compacted by the previous trip.

It should be noted that the present gauge wheel mechanism affords a dual range of vertical adjustment, that the gauge wheel can be readily attached and detached from the implement, that the gauge wheel can be reversed to run ahead or behind the tool bar, and that the gauge wheel mounting bracket is pivoted by the rock shaft adjusting mechanism.

Although but one embodiment of the present invention is shown and described, it should be apparent to one skilled in the art that changes and modifications may be made therein without departing from the spirit of the invention or from the scope of the following claims.

What is claimed is:

1. In an agricultural implement adapted for connection in trailing relation with a tractor and comprising a frame, a transverse tool bar mounted on said frame, tool units and gauge means mounted on said tool bar, said gauge means including a gauge wheel mounting bracket supported by said tool bar and rotatable on an axis transverse to said frame, a crank axle having a crank portion journaled in a gauge wheel and a shank portion secured to said gauge wheel mounting bracket so that said axis about which said gauge wheel mounting bracket rotates is parallel to the portion of said crank journaled in said gauge wheel and spaced from said shank portion, a rock shaft supported in spaced parallel relation to said tool bar, a member rotatable with said rock shaft and operatively connected with the free end of said shank portion to secure said gauge wheel in a selected vertically adjusted pivot position, and means for rocking said rock shaft to vertically swing said gauge wheel about said transverse axis for adjusting the vertical position of said tool units relative to said gauge wheel.

2. In an agricultural implement adapted for connection in trailing relation with a tractor and comprising a frame, a transverse tool bar mounted on said frame, tool units and gauge means mounted in laterally adjustable relation on said tool bar, said gauge means including a gauge wheel mounting bracket supported by said tool bar and rotatable on an axis transverse to said frame, a crank axle having a crank portion journaled in a gauge wheel and a shank portion extending vertically and secured for vertical adjustment in said gauge wheel mounting bracket so that said axis about which said gauge wheel mounting bracket rotates is parallel to the portion of said crank journaled in said gauge wheel and spaced from said shank portion, a rock shaft supported in spaced parallel relation to said tool bar, a member rotatable with said rock shaft and operatively connected with the free end of said shank portion to secure said gauge wheel in a selected vertically adjusted pivot position, and means for rocking said rock shaft to vertically swing said gauge wheel about said transverse axis for adjusting the vertical position of said tool units relative to said gauge wheel.

3. In an agricultural implement adapted to be connected in trailing relation to a tractor, said implement comprising a frame, a transverse tool bar mounted on said frame, earth working tool units mounted on said tool bar in adjustable laterally spaced relation with one another, a gauge wheel, and means mounted on said tool bar for securing said gauge wheel in selected vertically adjusted positions relative to said tool bar, said means including a crank axle for said gauge wheel having one end journalled in said gauge wheel and the other end forming a vertically positioned shank portion, a bearing bracket mounted on said tool bar, a clamp pivotally mounted on said bearing bracket and securing said shank portion in selected vertically adjustable positions therein, rock shaft supports mounted on said tool bar, a rock shaft journaled in said rock shaft supports, an arm mounted radially of said rock shaft in operative engagement with said clamp to secure said clamp and gauge wheel in a selected vertically adjusted pivotable position on said bearing bracket, and means for rocking said rock shaft to adjust the vertical pivotable position of said gauge wheel relative to said tool units.

4. A lister comprising a frame, a transverse tool bar mounted on said frame for supporting a plurality of tool units, a bracket slidably mounted on an end portion of said tool bar, a bearing stud integral with said bracket and extending laterally from a lower portion of said bracket, a shank receiving sleeve journaled on said bearing stud for vertical swinging movement, a gauge wheel, a crank axle for said gauge wheel including a vertical shank portion extending through said sleeve and secured in said sleeve and adjustable vertically in said sleeve, a pair of rock shaft supports carried by said tool bar, a rock shaft journaled in said rock shaft supports and extending above said tool bar, an arm extending radially downward in operative engagement with said shank receiving sleeve, for rocking said sleeve about said stud and holding said sleeve and gauge wheel in a selected vertical position relative to said tool units upon corresponding with the rotative position of said rock shaft.

5. In an agricultural machine comprising a frame, a transversely extending tool bar fixedly mounted on said frame, tool units adapted to be mounted in adjustable lateral positions along said tool bar, laterally spaced brackets adjustably mounted laterally along said tool bar, a rock shaft journaled in said brackets, a shank receiving clamp journaled on one of said brackets on a laterally extending axis, a gauge wheel, a crank axle for said gauge wheel including a shank portion extending vertically in said shank clamp and adjustable vertically therein, and an arm rotatable with said rock shaft in operative engagement with said shank clamp at a point between the axis of said clamp and supporting bracket for limited vertical adjustment of the tool units relative to said gauge wheel upon rotative adjustment of said rock shaft.

6. In an agricultural machine comprising a frame, a transversely extending tool bar fixedly mounted on said frame, tool units adapted to be mounted in adjustable lateral positions along said tool bar, laterally spaced brackets adjustably mounted laterally along said tool bar, a rock shaft journaled in said brackets, a shank receiving clamp journaled on one of said brackets on a laterally extending axis, a gauge wheel, a crank axle for said gauge wheel including a shank portion extending vertically in said shank clamp and adjustable vertically therein, an arm rotatable with said rock shaft in operative engagement with said shank clamp at a point between the axis of said clamp and supporting bracket for limited vertical adjustment of the tool units relative to said gauge wheel upon rotative adjustment of said rock shaft, and said shank clamp and shank constructed and arranged to permit remounting of said shank in said shank clamp upon 180 degree reversal of said gauge wheel between a leading to a trailing position relative to said crank axle.

References Cited in the file of this patent

UNITED STATES PATENTS

| | | |
|---|---|---|
| 158,387 | Myers | Jan. 5, 1875 |
| 468,986 | Forbes | Feb. 16, 1892 |
| 632,389 | Wilbur | Sept. 5, 1899 |
| 1,119,624 | Milliken | Dec. 1, 1914 |
| 1,249,067 | Graham | Dec. 4, 1917 |